United States Patent
Hirano et al.

(10) Patent No.: US 9,945,037 B2
(45) Date of Patent: Apr. 17, 2018

(54) STEEL SHEET USED TO MANUFACTURE A CONTAINER AND METHOD OF MANUFACTURING THE SAME

(71) Applicant: NIPPON STEEL & SUMITOMO METAL CORPORATION, Tokyo (JP)

(72) Inventors: Shigeru Hirano, Tokyo (JP); Yoshiaki Tani, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 729 days.

(21) Appl. No.: 14/391,655

(22) PCT Filed: Oct. 15, 2013

(86) PCT No.: PCT/JP2013/077917
§ 371 (c)(1),
(2) Date: Oct. 9, 2014

(87) PCT Pub. No.: WO2014/061640
PCT Pub. Date: Apr. 24, 2014

(65) Prior Publication Data
US 2015/0064495 A1  Mar. 5, 2015

(30) Foreign Application Priority Data
Oct. 15, 2012 (JP) .................. 2012-228196

(51) Int. Cl.
*B32B 15/00* (2006.01)
*C23C 28/00* (2006.01)
(Continued)

(52) U.S. Cl.
CPC .............. *C23C 28/32* (2013.01); *B32B 15/01* (2013.01); *C23C 28/00* (2013.01);
(Continued)

(58) Field of Classification Search
None
See application file for complete search history.

(56) References Cited

U.S. PATENT DOCUMENTS

| 4,501,802 A | 2/1985 | Higuchi et al. |
| 4,592,965 A | 6/1986 | Deguchi et al. |
| 5,336,567 A | 8/1994 | Watanabe et al. |

FOREIGN PATENT DOCUMENTS

| JP | 56-169788 A | 12/1981 |
| JP | S56169788 | * 12/1981 |
| JP | 60-145380 A | 7/1985 |
| JP | 2-500602 A | 3/1990 |
| JP | 4-2795 A | 1/1992 |
| JP | 10-265966 A | 10/1998 |

(Continued)

OTHER PUBLICATIONS

International Search Report, dated Nov. 19, 2013, issued in PCT/JP2013/077917.

(Continued)

*Primary Examiner* — Daniel J Schleis
(74) *Attorney, Agent, or Firm* — Birch, Stewart, Kolasch & Birch, LLP

(57) ABSTRACT

A steel sheet used to manufacture a container, wherein the steel sheet includes a chromate film layer or a film layer including Zr on the Ni plating layer, the Ni plating layer includes one or more of a hydroxyl Ni and a Ni oxide, an adhesion amount of the Ni plating layer in terms of an amount of Ni is 0.3 g/m² or more, a concentration of oxygen atoms of the Ni plating layer due to the hydroxyl Ni and the Ni oxide is 1 to 10 atomic %, an adhesion amount of the chromate film layer in terms of the amount of Cr is 1 to 40 mg/m², and an adhesion amount of the film layer including Zr in terms of an amount of Zr is 1 to 40 mg/m² or more.

6 Claims, 2 Drawing Sheets

(51) Int. Cl.
*B32B 15/01* (2006.01)
*C25D 9/08* (2006.01)
*C25D 11/38* (2006.01)
*C25D 7/06* (2006.01)

(52) U.S. Cl.
CPC ........ *C23C 28/3455* (2013.01); *C25D 7/0614* (2013.01); *C25D 9/08* (2013.01); *C25D 11/38* (2013.01); *Y10T 428/12611* (2015.01)

(56) References Cited

FOREIGN PATENT DOCUMENTS

| | | | |
|---|---|---|---|
| JP | 11-138096 A | | 5/1999 |
| JP | 2000-263696 A | | 5/1999 |
| JP | H11138096 | * | 5/1999 |
| JP | 2000-26992 A | | 1/2000 |
| JP | 2998043 B2 | | 1/2000 |
| JP | 3060073 B2 | | 1/2000 |
| JP | 2000-334886 A | | 12/2000 |
| JP | 2005-149735 A | | 6/2005 |
| JP | 2007-231394 A | | 9/2007 |
| JP | 2013-204054 A | | 10/2013 |

OTHER PUBLICATIONS

Written Opinion of the International Searching Authority, dated Nov. 19, 2013, issued in PCT/JP2013/077917.
Extended European Search Report, dated Dec. 2, 2015, for European Application No. 13846497.2.

* cited by examiner

STEEL SHEET USED TO MANUFACTURE A CONTAINER AND METHOD OF MANUFACTURING THE SAME

TECHNICAL FIELD OF THE INVENTION

The present invention relates to a steel sheet used to manufacture a container and a method of manufacturing the same, and particularly to a steel sheet used to manufacture a container that is used to manufacture 2-piece cans and 3-piece cans and is excellent in terms of corrosion resistance, adhesion and weldability, and a method of manufacturing the same.

Priority is claimed on Japanese Patent Application No. 2012-228196, filed on Oct. 15, 2012, and the contents of which are incorporated herein by reference.

RELATED ART

As steel containers mainly used in the beverage can field, there are 2-piece cans and 3-piece cans.

The 2-piece can refers to a can body in which a can bottom and a can cylindrical portion are integrated together, and DrD can, DI can and the like are known. The 2-piece can is formed and manufactured through drawing, ironing, bending and unbending or a combination of the above-described processes. Tin steel sheet (Sn plating steel sheet) or tin-free steel (TFS, electrolytically chromated steel sheet) are steel sheets used to manufacture the can bodies of 2-piece cans, and are selectively used depending on usages or processing methods.

Meanwhile, the 3-piece can refers to a can body in which a can cylindrical portion and a can bottom are separated from each other, and the can cylindrical portions are mainly manufactured by forming a thin steel sheet into a cylindrical shape and joining joints through welding. Cans having a can cylindrical portion manufactured through welding as described above are called welded cans. In addition, lightly tin coated steel sheets or Ni plating steel sheets are used as materials to manufacture the can cylindrical portions of 3-piece cans. In addition, TFS and other materials are used as materials used to manufacture the can bottoms of 3-piece cans.

In both 2-piece cans and 3-piece cans, the can outer surface is printed to appeal the values (commercial values) of contents in the cans to consumers. In addition, the can inner surface is coated with a resin to ensure corrosion resistance.

For conventional 2-piece cans, after forming can bodies, the can inner surfaces were coated through spraying or the like, and curved surface printing was performed on the can outer surfaces. In recent years, laminate 2-piece cans obtained by forming a steel sheet on which a PET film has additionally been laminated in advance into cans have emerged (Patent Documents 1 and 2).

In addition, 3-piece welded cans as well, bodies of which were manufactured by welding a conventional steel sheet having a coated can inner surface and a printed can outer surface, 3-piece cans manufactured using a laminate steel sheet on which a previously-printed PET film has been stacked instead of being coated and printed have also emerged (Patent Documents 3 and 4).

When manufacturing a 2-piece can, drawing, ironing, and bending and unbending are performed on a steel sheet used to manufacture a container. In addition, when manufacturing a 3-piece can, neck processing or flange processing is performed on a steel sheet used to manufacture containers, and, sometimes, expansion of a steel sheet used to manufacture containers is performed to improve designability. Therefore, to laminate steel sheets used as steel sheets used to manufacture containers, there is an increasing demand for excellent film adhesion that can withhold the above-described processes.

In a case in which a Sn plating steel sheet is used as a steel sheet used to manufacture a container, due to the excellent sacrificial protection action of Sn, the Sn plating steel sheet exhibits excellent corrosion resistance against acidic contents in cans. However, since a brittle Sn oxide is present on the outermost layer of the Sn plate, the adhesion of a film formed on the plate is unstable. Therefore, when the Sn plating steel sheet is subjected to the above-described drawing and other processing there are problems in that the film is exfoliated, and, furthermore, corrosion begins to occur at places in which the adhesion between the film and the steel sheet used to manufacture containers is not sufficient.

Thus, Ni plating steel sheets are being used as laminate steel sheets used to manufacture containers that are excellent in terms of workability and adhesion, and, furthermore, are weldable (Patent Document 5).

Regarding Ni plating steel sheets, a variety of techniques have been thus far disclosed (for example, Patent Document 9). In addition, while there are Ni plating steel sheets having a dull surface like Sn plating steel sheets, Ni plating steel sheets on which bright plating is performed using a brightening agent-added Ni plating method are also known (Patent Documents 6 and 7).

However, unlike Sn, Ni does not have a sacrificial protection action in acidic solutions. Thus, it is known that, in a case in which the Ni plating steel sheet is used to manufacture containers that contain highly corrosive contents such as an acidic beverage, piercing corrosion in which corrosion proceeds from defects such as pin holes in a Ni plating layer in the film thickness direction occurs, and the Ni plating steel sheet is pierced within a short period of time. Therefore, there has been a demand to improve the corrosion resistance of the Ni plating steel sheets.

Regarding the above-described problem, to reduce piercing corrosion, a Ni plating steel sheet in which the steel component of a tin mill black plate (base steel sheet) is adjusted so that the electrical potential of a steel sheet to be plated approximates in the positive direction has been disclosed (Patent Document 8).

In addition, it is known that, when manufacturing Ni plating steel sheets, Ni in the Ni plating layer is oxidized due to dissolved oxygen in a plating bath or oxygen in an atmosphere such that a Ni oxide film is formed on the surface of the Ni plating layer. However, in a case in which a chromate treatment is performed on the Ni plating layer for the purpose of the improvement of corrosion resistance, the amount of chromate precipitation varies depending on the film-forming state of the above-described Ni oxide film, and there is a problem in that the poor appearance of containers is caused.

Regarding the above-described problem, a method of ensuring favorable appearances by performing Ni plating, and then forming a uniform Ni oxide film on the Ni plating layer through a controlled thermal treatment has been disclosed (Patent Document 10).

PRIOR ART DOCUMENT

Patent Document

[Patent Document 1] Japanese Unexamined Patent Application, First Publication No. 2000-263696

[Patent Document 2] Japanese Unexamined Patent Application, First Publication No. 2000-334886
[Patent Document 3] Japanese Patent No. 3060073
[Patent Document 4] Japanese Patent No. 2998043
[Patent Document 5] Japanese Unexamined Patent Application, First Publication No. 2007-231394
[Patent Document 6] Japanese Unexamined Patent Application, First Publication No. 2000-26992
[Patent Document 7] Japanese Unexamined Patent Application, First Publication No. 2005-149735
[Patent Document 8] Japanese Unexamined Patent Application, First Publication No. S60-145380
[Patent Document 9] Japanese Unexamined Patent Application, First Publication No. S56-169788
[Patent Document 10] Japanese Unexamined Patent Application, First Publication No. H10-265966

DISCLOSURE OF THE INVENTION

Problems to be Solved by the Invention

In the invention described in Patent Document 8, although there was a certain degree of effect in reducing piercing corrosion, the effect was insufficient with the simple adjustment of the steel component of the tin mill black plate, and there was a demand for additional improvement of corrosion resistance. In addition, in the invention described in Patent Document 8, since the steel component of the tin mill black plate was limited, the Ni plating steel sheet was applicable only to some usages. Therefore, there was a demand for Ni plating steel sheets applicable to diverse contents or diverse can shapes.

In addition, while the invention described in Patent Document 10 could ensure favorable appearances, no consideration was given to the piercing corrosion of the Ni plating layer, and thus the corrosion resistance of the plating steel sheet was insufficient.

Therefore, the invention has been made in consideration of the above-described problems, and an object of the invention is to provide a steel sheet used to manufacture a container which is excellent in terms of corrosion resistance, adhesion and weldability, and a method of manufacturing the same.

Means Used to Solve the Problem

As a result of studies to achieve the reduction of piercing corrosion, the present inventors found that, when one or more of a hydroxyl Ni and a Ni oxide is included not on a surface of a Ni plating layer but inside the Ni plating layer, the corrosion resistance with respect to piercing corrosion can be improved. Specifically, when a Ni plating layer including one or more of a hydroxyl Ni and a Ni oxide was formed on a steel sheet, that is, a tin mill black plate, a phenomenon in which the piercing corrosion rate was decreased when corrosion proceeded from defects such as pin holes in the Ni plating layer was observed (refer to FIG. 1. FIG. 1 will be described below in detail).

The above-described phenomenon is assumed to proceed with the following mechanism.

The hydroxyl Ni and the Ni oxide are easily dissolved in acidic solutions. That is, since the hydroxyl Ni and the Ni oxide in the Ni plating layer are preferentially dissolved in the initial phase of corrosion, it is considered that an increasing number of voids are included inside the Ni plating layer as the corrosion proceeds. In addition, since the number of voids appear in the Ni plating layer, it is considered that corrosion (piercing corrosion), which concentrated at pin holes if the conventional steel sheet is used, is dispersed to the voids, the corrosion type changes from piercing corrosion to general corrosion or corrosion (interfacial corrosion) at the interface between the Ni plating layer and base iron, and the rate of the proceeding piercing corrosion decreases.

Furthermore, as a result of additional studies based on the above-described knowledge, it was found that, when one or more of the hydroxyl Ni and the Ni oxide was dispersed and distributed in the thickness direction of the Ni plating layer, piercing corrosion could be further reduced.

The inventors invented a steel sheet used to manufacture a container that was excellent in terms of corrosion resistance, adhesion and weldability using the above-described phenomenon.

That is, the invention obtained from the above-described knowledge is what will be described below.

(1) According to an aspect of the invention, there is provided a steel sheet used to manufacture a container including a Ni plating layer; and a chromate film layer or a film layer including Zr, on the Ni plating layer, in which the Ni plating layer includes one or more of a hydroxyl Ni and a Ni oxide, the adhesion amount of the Ni plating layer in terms of an amount of Ni is 0.3 g/m$^2$ or more, the concentration of oxygen atoms of the Ni plating layer due to the hydroxyl Ni and the Ni oxide is 1 to 10 atomic %, an adhesion amount of the chromate film layer in terms of the amount of Cr is 1 to 40 mg/m$^2$, and the adhesion amount of the film layer including Zr in terms of the amount of Zr is 1 to 40 mg/m$^2$.

(2) In the steel sheet used to manufacture a container according to the above-described (1), the concentration of the oxygen atom is 1 to 10 atomic % in an entire area of a thickness of the Ni plating layer excluding a natural oxide film formed on a surface of the Ni plating layer.

(3) According to another aspect of the invention, there is provided a method of manufacturing a steel sheet used to manufacture a container according to the above-described (1), the method including: a step of forming the Ni plating layer including one or more of the hydroxyl Ni and the Ni oxide by dipping a base steel sheet in a plating bath and then performing an cathode-electrolysis under a current density higher than a critical current density of precipitation of Ni, in which the plating bath consists of an aqueous solution in which one or more of a Ni sulfate and a Ni chloride is dissolved; and a step of forming the chromate film layer of which the adhesion amount in terms of the amount of Cr is 1 to 40 mg/m$^2$ on the Ni plating layer or a step of forming the film layer including Zr of which the adhesion amount in terms of the amount of Zr is 1 to 40 mg/m$^2$, on the Ni plating layer.

Effects of the Invention

According to the invention, one or more of the hydroxyl Ni and the Ni oxide is included inside the Ni plating layer, and the chromate film layer or the film layer including Zr is formed on the above-described Ni plating layer, whereby it is possible to provide a steel sheet used to manufacture a container which is excellent in terms of corrosion resistance with respect to piercing corrosion, and, furthermore, is excellent in terms of adhesion with laminated resin films and weldability.

EMBODIMENTS OF THE INVENTION

Figure 1:
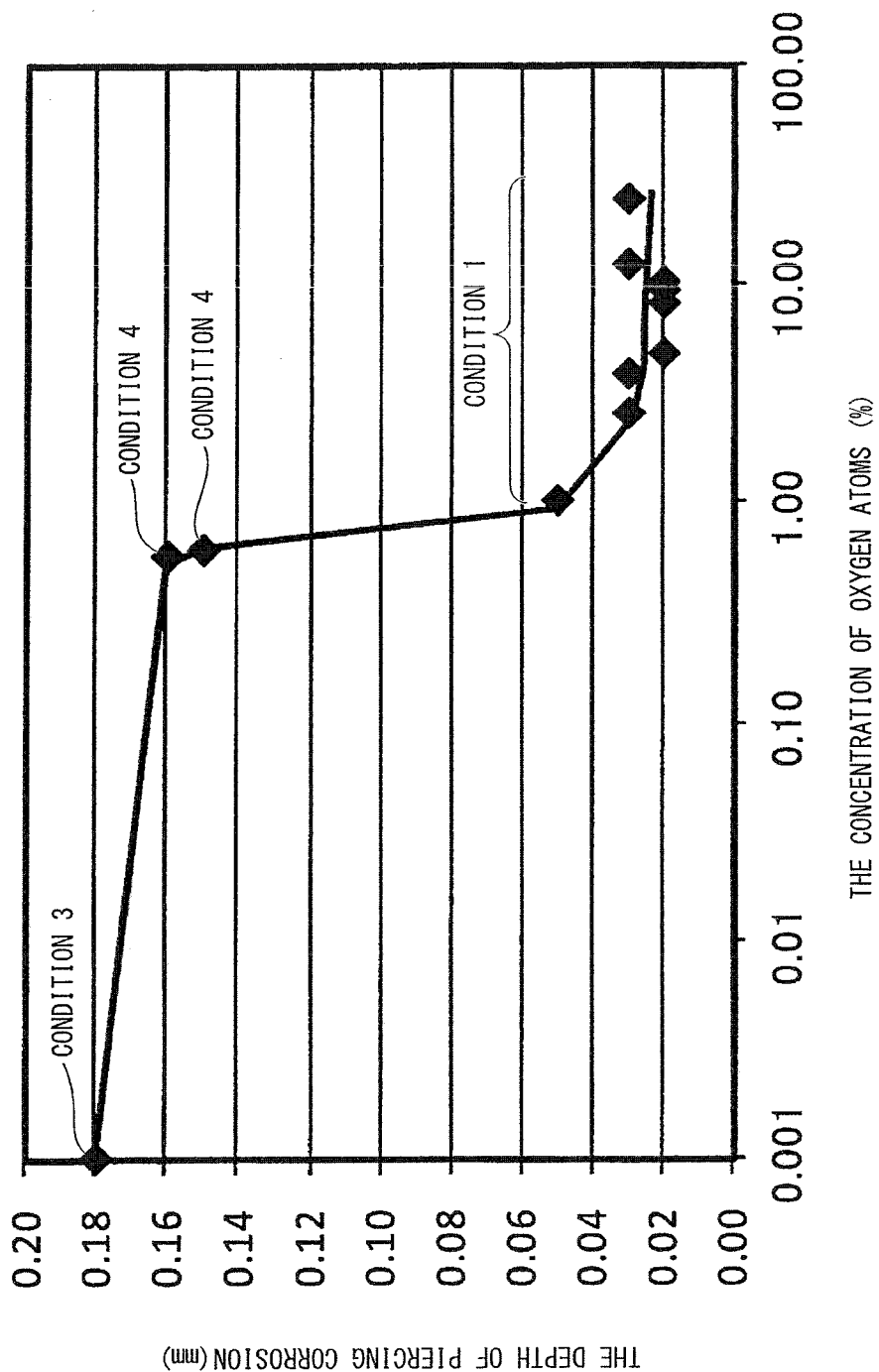
FIG. 1 is a graph illustrating a relationship between a concentration of an oxygen atom in a Ni plating layer and piercing corrosion depth in Example 2 of the invention.

The invention is a steel sheet including a chromate film layer or a film layer including Zr on the Ni plating layer, and the Ni plating layer includes one or more of a hydroxyl Ni and a Ni oxide. Meanwhile, in the steel sheet used to manufacture a container of the invention, the adhesion amount of the Ni plating layer in terms of the amount of Ni is 0.3 g/m² or more, and the concentration of oxygen atoms in the Ni plating layer due to the hydroxyl Ni and the Ni oxide included in the Ni plating layer is 1 to 10 atomic %. In addition, the adhesion amount of the chromate film layer formed on the Ni plating layer in terms of the amount of Cr is 1 to 40 mg/m², and the adhesion amount of the film layer including Zr in terms of the amount of Zr is 1 to 40 mg/m².

Hereinafter, a steel sheet used to manufacture a container which is an embodiment of the invention will be described in detail.

A steel sheet used to manufacture a container according to the present embodiment has a Ni plating layer including one or more of a hydroxyl Ni and a Ni oxide formed on a surface of the steel sheet, and the Ni plating layer has an adhesion amount of Ni of 0.3 g/m² or more and the concentration of oxygen atoms of the hydroxyl Ni and the Ni oxide of 1 to 10 atomic %.

In addition, a chromate film layer or a film layer including Zr is provided on the surface of the Ni plating layer. The chromate film layer has an adhesion amount in terms of the amount of Cr of 1 to 40 mg/m², and is formed on the Ni plating layer. In addition, in a case in which a film layer including Zr is formed instead of the chromate film layer, the film layer including Zr is formed on the Ni plating layer at an adhesion amount in terms of the amount of Zr of 1 to 40 mg/m².

The steel sheet used to manufacture a container in the present embodiment is a tin mill black plate. Examples of the steel sheet include cold-rolled steel sheets manufactured through an ordinary process of manufacturing slabs and processes such as hot rolling, pickling, cold rolling, annealing and temper rolling. Here, there is no particular limitation in the components or characteristics of the steel sheet according to the embodiment, and, for example, low-carbon steel other steel generally used to manufacture a steel sheet used to manufacture a container can be used.

In the embodiment, a Ni plating layer including one or more of a hydroxyl Ni and a Ni oxide is formed on the above mentioned steel sheet, which is the tin mill black plate, in order to ensure corrosion resistance, adhesion and weldability.

Meanwhile, hereinafter, the tin mill black plate (base steel sheet) according to the embodiment will also be referred to simply as "steel sheet".

<Ni Plating Layer>

Ni is a metal that is excellent in terms of adhesion and forge-weldability (a characteristic to be joined at a temperature of the melting point or lower) with respect to steel sheets and can exhibit favorable weldability, and, when the adhesion amount in terms of Ni is set to 0.3 g/m² or more in performing Ni plating on steel sheets, practical adhesion, weldability and forge-weldability begin to be exhibited. Therefore, it is necessary to set the amount in terms of Ni to 0.3 g/m² or more in the Ni plating layer. The amount in terms of Ni is preferably set to 0.4 g/m² or more, and more preferably set to 0.6 g/m² or more.

Meanwhile, when the adhesion amount of a Ni plate is increased, adhesion or weldability improves; however, when the amount in terms of Ni exceeds 3 g/m², the effect that improves adhesion and weldability is saturated, which is economically disadvantageous. Therefore, the upper limit of the amount in terms of Ni is preferably set to 3 g/m², and more preferably set to 2.5 g/m² or less.

The Ni plating layer includes one or more of a hydroxyl Ni and a Ni oxide. That is, the Ni plating layer may include both a hydroxyl Ni and a Ni oxide, and may include any one of a hydroxyl Ni and a Ni oxide. Meanwhile, there is a plurality of chemical forms of the Ni oxide, and, in the embodiment, it is difficult to specify what form of the Ni oxide is included; however, mainly, NiO or $Ni_2O_3$ is included.

In addition, in the conventional steel sheet and the method of manufacturing the same (particularly Patent Document 10), techniques to form the Ni oxide on the Ni plating layer by oxidizing the surface of the Ni plating layer have been studied; however, unlike the related art, in the embodiment, the Ni plating layer includes both a hydroxyl Ni and a Ni oxide. That is, while a Ni oxide layer was formed on the surface of a Ni plating layer, and, on the other hand, the tin mill black plate side of the Ni plating layer was a double layer structure in which a pure Ni layer was formed in the past, the Ni plating layer according to the embodiment includes a hydroxyl Ni and a Ni oxide in the entire area in the thickness direction.

The concentration of oxygen atoms due to the hydroxyl Ni and/or the Ni oxide included in the Ni plating layer is set to 1 to 10 atomic %.

When the content rate of the hydroxyl Ni and/or the Ni oxide in the Ni plating layer is too low, the above-described piercing corrosion-reducing effect is not sufficiently exhibited. At a concentration of oxygen atoms due to the hydroxyl Ni and/or the Ni oxide included in the Ni plating layer of 1 atomic % or more, the piercing corrosion rate begins to be suppressed, and it is possible to reduce piercing corrosion. From the above-described viewpoint, the concentration of oxygen atoms due to the hydroxyl Ni and/or the Ni oxide included in the Ni plating layer is set to 1 atomic % or more, preferably set to 2 atomic % or more, and more preferably set to 3.5 atomic % or more.

On the other hand, when the content rate of the hydroxyl Ni and/or the Ni oxide in the Ni plating layer becomes excessive, the forge-weldability of Ni is impaired, and, consequently, the weldability deteriorates. Therefore, the concentration of oxygen atoms due to the hydroxyl Ni and/or the Ni oxide in the Ni plating layer needs to be set to 10 atomic % or less, preferably set to 8.5 atomic % or less, and more preferably set to 8 atomic % or less.

The concentration of oxygen atoms due to the hydroxyl Ni and/or the Ni oxide in the Ni plating layer can be measured by measuring a specimen after Ni plating on which a chromate film layer or a film layer including Zr described below is not present using X-ray photoelectron spectroscopy (XPS).

In addition, the Ni plating layer according to the embodiment may include unavoidable impurities in addition to the above-described hydroxyl Ni or Ni oxide as long as the effect of the invention is not impaired.

In addition, in the Ni plating layer according to the embodiment, the concentration of oxygen atoms due to the hydroxyl Ni or the Ni oxide is preferably 1 to 10 atomic % in the entire area of the thickness of the Ni plating layer excluding a natural oxide film formed on the surface of the Ni plating layer.

The steel sheet used to manufacture containers according to the embodiment is obtained by performing Ni plating on the tin mill black plate, and then forming the chromate film layer or the film layer including Zr described below. However, between the step of performing Ni plating and the step of forming the chromate film layer or the film layer including Zr, there is a case in which the Ni plating steel sheet is exposed to the atmosphere, air in the atmosphere and the surface of the Ni plating layer react with each other, and Ni in the surface of the Ni plating layer is oxidized, thereby forming an natural oxide film. In the above-described case, the oxygen concentration distribution in the Ni plating layer becomes high on the surface of the plating layer. However, the important fact in the embodiment is that one or more of the hydroxyl Ni and the Ni oxide is included in the entire area of the Ni plating layer irrespective of the formation of the natural oxide film on the surface of the Ni plating layer.

Therefore, in the Ni plating layer according to the embodiment, the concentration of the oxygen atom due to the hydroxyl Ni and/or the Ni oxide is preferably 1 to 10 atomic % in the entire area of the thickness of the Ni plating layer excluding a Ni oxide layer (natural oxide film) formed on the surface of the Ni plating layer. When one or more of the hydroxyl Ni and the Ni oxide is uniformly dispersed in the entire area the thickness of the Ni plating layer excluding the Ni oxide layer (natural oxide film) on the surface of the Ni plating layer, piercing corrosion that concentrates at pin holes in the Ni plating layer can be dispersed using voids generated by the dissolution of the hydroxyl Ni and the Ni oxide, and it becomes possible to reduce the piercing corrosion rate.

<Chromate Film Layer>

Since a Cr metal or a hydrated Cr oxide that configures the chromate film layer has excellent chemical stability, the corrosion resistance of the steel sheet used to manufacture a container improves in proportion to the adhesion amount of the chromate film layer. In addition, since the hydrated Cr oxide exhibits excellent adhesion even in a heated moisture atmosphere by forming a strong chemical bond with a functional group of a resin film, the adhesion of the chromate film layer to the resin film improves as the adhesion amount of the chromate film layer increases. From the above-described viewpoint, 1 mg/m$^2$ or more of the chromate film layer in terms of the amount of the Cr metal is required to exhibit sufficient corrosion resistance and sufficient adhesion for practical use. The content rate of the chromate film layer in terms of the amount of the Cr metal is preferably set to 2.5 mg/m$^2$ or more.

Meanwhile, while the effect that improves the corrosion resistance and the adhesion enhances as the adhesion amount of the chromate film layer increases, since the hydrated Cr oxide in the chromate film layer is an electrically insulating body, when the adhesion amount of the chromate film layer increases, the electric resistance of the steel sheet used to manufacture a container becomes extremely high, and the weldability deteriorates. Specifically, when the adhesion amount of the chromate film layer in terms of the amount of the Cr metal exceeds 40 mg/m$^2$, the weldability extremely deteriorates. Therefore, the adhesion amount of the chromate film layer in terms of the amount of the Cr metal needs to be set to 40 mg/m$^2$ or less, and preferably set to 30 mg/m$^2$ or less.

<Film Layer Including Zr>

In addition, the film layer including Zr may be formed on the Ni plating layer instead of the above-described chromate film layer. The film layer including Zr is a film made of a Zr compound, such as a Zr oxide, Zr phosphate, hydroxyl Zr or Zr fluoride, or a composite film thereof. When the film layer including Zr is formed in an adhesion amount in terms of the amount of a Zr metal of 1 mg/m$^2$ or more, similarly to the above-described chromate film layer, the drastic improvement of the adhesion or corrosion resistance of the film layer including Zr with respect to the resin film is observed. Therefore, the adhesion amount of the film layer including Zr in terms of the amount of Zr is set to 1 mg/m$^2$ or more, and preferably set to 2.5 mg/m$^2$ or more.

On the other hand, when the adhesion amount of the film layer including Zr in terms of the amount of the Zr metal exceeds 40 mg/m$^2$, the weldability and the appearance deteriorate. Particularly, since the film layer including Zr is an electrically insulating body, when the adhesion amount of the film layer including Zr increases, the electric resistance of the steel sheet used to manufacture a container becomes extremely high, and the weldability deteriorates. Specifically, when the adhesion amount of the film layer including Zr in terms of the amount of the Zr metal exceeds 40 mg/m$^2$, the weldability extremely deteriorates. Therefore, the adhesion amount of the Zr film layer in terms of the amount of the Zr metal needs to be set to 1 to 40 mg/m$^2$, and preferably set to 30 mg/m$^2$ or less.

Next, a method of manufacturing a steel sheet used to manufacture a container, which is an embodiment of the invention, will be described.

The method of manufacturing a steel sheet used to manufacture a container according to the present embodiment includes, firstly, a step of forming the Ni plating layer including one or more of the hydroxyl Ni and the Ni oxide by dipping a tin mill black plate (base steel sheet) in a plating bath and then performing an cathode-electrolysis under a current density higher than a critical current density of precipitation of Ni, in which the plating bath consists of an aqueous solution in which one or more of a Ni sulfate and a Ni chloride is dissolved, and a step of forming the chromate film layer of which the adhesion amount in terms of the amount of Cr is 1 to 40 mg/m$^2$ on the obtained Ni plating layer or a step of forming the film layer including Zr of which the adhesion amount in terms of the amount of Zr is 1 to 40 mg/m$^2$ on the obtained Ni plating layer.

A method of forming the Ni plating layer including one or more of the hydroxyl Ni and the Ni oxide on a steel sheet will be described First, a tin mill black plate is dipped in a plating bath consisting of an aqueous solution in which one or more of a well-known Ni sulfate and a well-known Ni chloride is dissolved, and then a cathode-electrolysis is performed under a current density which is higher than the critical current density of the precipitation of Ni. When the cathode-electrolysis is performed under a current density set to be higher than the critical current density of the precipitation of Ni as described above, it is possible to promote the generation of a hydroxyl nickel or a nickel oxide by an increase in pH at the interface of the plating layer, and it is possible to obtain the Ni plating layer including one or more of the hydroxyl Ni and the Ni oxide.

Meanwhile, the concentrations of the Ni sulfate and the Ni chloride are not particularly limited, but it is possible to set the concentration of the Ni sulfate to 5 to 30% and the Ni chloride to 5 to 30%.

In addition, the pH of the plating bath is not particularly limited, but it is possible to set the pH to 2 to 4 from the viewpoint of liquid stability.

The critical current density in the invention refers to a current density at which the adhesion efficiency of Ni begins to decrease when gradually increasing the current density, and is known to be dependent on the concentration of a Ni ion, the pH, the flow rate of a liquid and the bath temperature of the plating bath. That is, there is a tendency of the critical current density increasing as the concentration of a Ni ion, the pH, the flow rate of a liquid and the bath temperature become high. Meanwhile, the adhesion efficiency of Ni can be computed from the adhesion amount of Ni and the amount of electric conduction.

For example, Patent Documents 8 and 9 describe a wide range of the current density of 3 to 300 $A/dm^2$. In a case in which the Ni plating layer including the hydroxyl Ni or the Ni oxide is formed by the cathode-electrolysis under a high current density, it is possible to obtain a current density that is higher than 300 $A/dm^2$ depending on the conditions of the plating bath.

On the other hand, there is a tendency of the critical current density being decreased by decreasing the concentration of a Ni ion or the pH. That is, depending on the conditions of the plating bath, the critical current density is exceeded at a lower current density of 10 $A/dm^2$, and it is possible to obtain the Ni plating layer including the hydroxyl Ni or the Ni oxide.

That is, to form the Ni plating layer including one or more of the hydroxyl Ni or the Ni oxide, it is extremely important to set the current density during the cathode-electrolysis to be higher than the critical current density. In a case in which Ni plating is performed under conditions in which the current density is lower than the critical current density, the pH at the interface of the plating layer does not sufficiently increases, and it becomes difficult to promote the generation of the hydroxyl Ni or the Ni oxide. As a result, it is not possible to sufficiently ensure the hydroxyl Ni or the Ni oxide included in the Ni plating layer.

In addition, to more easily and more stably form the Ni plating layer including the hydroxyl Ni or the Ni oxide, it is possible to use a bath in which a boric acid or a Ni chloride that suppresses an increase in the pH at the interface is not used. In a bath in which a boric acid or a Ni chloride is not used, since the critical current density decreases, it is possible to obtain the Ni plating layer including the hydroxyl Ni or the Ni oxide at a relatively low current density.

Meanwhile, in a case in which plating is performed using a plating bath including a boric acid, since there is a tendency of the pH in the interface increasing, compared with a case in which a plating bath not including a boric acid is used, it is necessary to set the current density to be higher.

Meanwhile, it is possible to appropriately select one of a Ni plating method in which the plating bath includes a boric acid and a Ni plating method in which the plating bath does not include a boric acid depending on the treatment time in a plating treatment facility to which the method is applied. In addition, since the current density to be used is set to a value higher than the critical current density by 10% or more and preferably more than 20%, it is possible to manufacture the above-described Ni plating layer including one or more of the hydroxyl Ni and the Ni oxide in an industrially stable manner by performing the cathode-electrolysis.

Meanwhile, the adhesion amount of Ni, the adhesion amount of the chromate film layer described below, and the adhesion amount of the film layer including Zr can be easily measured using a well-known analyzer such as a fluorescent X-ray apparatus or an X-ray photoelectron spectroscope.

Next, the chromate film layer of which the adhesion amount in terms of the amount of Cr is 1 to 40 $mg/m^2$ or the film layer including Zr of which the adhesion amount in terms of the amount of Zr is 1 to 40 $mg/m^2$ is formed on the Ni plating layer obtained in the above-described manner.

It is possible to improve the corrosion resistance, the adhesion with the resin film, and, particularly, the secondary adhesion after processes by forming the chromate film layer on the Ni plating layer. The chromate film layer consists of a hydrated Cr oxide or a hydrated Cr oxide and a Cr metal, and is formed using a chromate treatment.

As a method of the chromate treatment, any method of a dipping treatment in which an aqueous solution of a variety of sodium salts, potassium salts, ammonium salts and the like of a Cr acid is used, a spray treatment, an electrolysis treatment and the like may be performed. Among the above-described methods, particularly, a method in which a cathode electrolysis treatment is performed in an aqueous solution in which a sulfuric acid ion, a fluoride ion (including a complex ion) or a mixture thereof is added to a Cr acid as a plating aid is industrially excellent.

As a method of forming the film layer including Zr, for example, a well-known method, such as a dipping treatment method or a cathode-electrolysis treatment method of a steel sheet after the formation of the above-described Ni plating layer in an acidic solution including a Zr fluoride, a Zr phosphate and a fluoric acid as a main component, may be employed.

According to the above-described manufacturing method, it is possible to manufacture the steel sheet used to manufacture a container according to the embodiment. Meanwhile, conditions other than the conditions of the above-described manufacturing method may be appropriately determined in consideration of a plating facility to be used and the like as long as the effects of the invention are not impaired.

According to the embodiment, it is possible to improve the piercing corrosion resistance of the steel sheet used to manufacture a container, and to improve weldability, adhesion with respect to the resin film, and adhesion with respect to the resin film after processes.

EXAMPLES

Next, the invention will be described in more detail using examples, but the conditions in the present examples are employed to confirm the feasibility and effect of the invention, and the invention is not limited to the conditions described herein.

The invention can employ a variety of conditions or combinations of conditions within the scope of the purpose of the invention as long as the object of the invention is achieved.

Example 1

First, the examples and comparative examples of the invention will be described, and the results are described in Table 1.

In the examples, specimens were produced using a method described in the following (1), and performance evaluation was performed on the respective items (A) to (D) in (2).

(1) Method of Producing Specimens

[Steel Sheet (Tin Mill Black Plate)]

A 0.2 mm-thick cold-rolled steel sheet for a tin plate with a temper grade of 3 (T-3) was used as a tin mill black plate.

[Ni Plating Condition 1]

A nickel sulfate having a concentration of 20%, a nickel chloride having a concentration of 10%, and an aqueous solution having an adjusted pH of 2 and a temperature of 35° C. were used, and a cathode-electrolysis was performed under a current density of 25 A/dm$^2$ that exceeded the critical current density, thereby forming a Ni plating layer on the steel sheet. The adhesion amount of Ni was controlled using the electrolysis time.

[Ni Plating Condition 2]

A boric acid having a concentration of 3%, a nickel sulfate having a concentration of 10%, a nickel chloride having a concentration of 10%, and an aqueous solution having an adjusted pH of 4 and a temperature of 45° C. were used, and a cathode-electrolysis was performed under a current density of 55 A/dm$^2$ that exceeded the critical current density, thereby forming a Ni plating layer on the steel sheet. The adhesion amount of Ni was controlled using the electrolysis time.

[Ni Plating Condition 3]

A nickel sulfate having a concentration of 20%, a nickel chloride having a concentration of 10%, and an aqueous solution having an adjusted pH of 2 and a temperature of 35° C. were used, and a cathode-electrolysis was performed under a current density of 10 A/dm$^2$ that was lower than the critical current density, thereby forming a Ni plating layer on the steel sheet. The adhesion amount of Ni was controlled using the electrolysis time.

[Ni Plating Condition 4]

A boric acid having a concentration of 3%, a nickel sulfate having a concentration of 10%, a nickel chloride having a concentration of 10%, and an aqueous solution having an adjusted pH of 4 and a temperature of 45° C. were used, and a cathode-electrolysis was performed under a current density of 20 A/dm$^2$ that exceeded the critical current density, thereby forming a Ni plating layer on the steel sheet. The adhesion amount of Ni was controlled using the electrolysis time.

[Treatment Conditions of the Chromate Film Layer]

A cathode-electrolysis was performed at 10 A/dm$^2$ in an aqueous solution including a chromium (VI) oxide having a concentration of 10%, a sulfuric acid having a concentration of 0.2% and an ammonium fluoride having a concentration of 0.1%, and water washing was performed for 10 seconds, thereby forming a chromate film layer on the Ni plating layer. The adhesion amount of Cr in the chromate film layer was controlled using the electrolysis time.

[Treatment Conditions of the Film Layer Including Zr]

A cathode-electrolysis was performed at 10 A/dm$^2$ in an aqueous solution of a zirconium fluoride having a concentration of 5%, a phosphoric acid having a concentration of 4% and a fluoric acid having a concentration of 5%, thereby forming a film layer including Zr on the Ni plating layer. The adhesion amount of Zr in the film layer including Zr was controlled using the electrolysis time.

(2) Evaluation Method of the Specimens (A) Weldability

First, the specimen (plating steel sheet) obtained using the above-described method was used as a test specimen, a 15 μm-thick PET film was laminated on the test specimen, and welding was performed at changed currents under conditions of a lap part of 0.5 mm, a welding pressure of 45 kgf (1 kgf is equal to approximately 9.8 N.) and a welding wire speed of 80 m/min. The ranges of the appropriate welding conditions were comprehensively determined from the width of an optimal current range consisting of the minimum current value at which a sufficient weld strength could be obtained and the maximum current value at which a welding defect such as scatter began to appear, and the stabilized welding state, and the ranges were evaluated into 4 levels (A: extremely wide, B: wide, C: no practical problem, D: narrow).

(B) Adhesion

A 15 μm-thick PET film was laminated on the specimen obtained using the above-described method, and a cup was produced through DrD pressing. The cup was formed into a DI can using a DI machine. The exfoliation status of the film in the can wall portion of the DI can after the forming was observed, and was comprehensively evaluated into 4 levels (A: exfoliation was not observed, B: slight film floating was observed, C: significant exfoliation was observed, D: the film was exfoliated during the DI forming, and the cylinder was broken).

(C) Secondary Adhesion

A 15 μm-thick PET film was laminated on the specimen obtained using the above-described method, and a cup was produced through DrD pressing. The cup was formed into a DI can using a DI machine. After that, a thermal treatment was performed at a temperature higher than the melting point of the PET film (approximately 240° C.) for 10 minutes, and, furthermore, the DI can was treated (retort treatment) in a heated moisture atmosphere at 125° C. for 30 minutes. In addition, the exfoliation status of the film in the can wall portion of the DI can after the retort treatment was observed, and was comprehensively evaluated into 4 levels (A: exfoliation was not observed, B: slight film floating was observed, C: significant exfoliation was observed, D: the film was exfoliated during the DI forming, and the cylinder was broken).

(D) Corrosion Resistance

A welded can on which a 15 μm-thick PET film was laminated was produced using the specimen obtained using the above-described method, and the welded portion was coated with refinish paint. After that, a test liquid consisting of a liquid mixture of 1.5% citric acid and 1.5% common salt was loaded into the welded can, a lid was attached and sealed, and the can was stably left in a constant-temperature chamber for one month in an environment of 55° C. After that, the corrosion status in the damaged film portion inside the welded can was determined and evaluated into 4 levels (A: piercing corrosion was not observed, B: slight piercing corrosion resulting in no practical problem was observed, C: the progress of piercing corrosion was observed, D: a hole was generated due to piercing corrosion).

The evaluation results of the weldability, adhesion, secondary adhesion and corrosion resistance of Examples 1 to 11 and Comparative Examples 1 to 7 in which the adhesion amount of the Ni plate, the concentration of an oxygen atom of the hydroxyl Ni or the Ni oxide, and the chromate film layer or the film layer including Zr was formed are described in Table 1. In Table 1, numeric values which are not within the ranges of the invention are underlined.

Meanwhile, in Table 1, the adhesion amount (g/m$^2$) of the Ni plate, and the concentration (atomic %) of an oxygen atom of the hydroxyl Ni or the Ni oxide in the Ni plating layer were specified by measuring the specimens after Ni plating using an X-ray photoelectron spectroscopy (XPS).

[Table 1]

As described in Table 1, it is found that the steel sheets of Invention Examples 1 to 11 are all excellent in terms of weldability, adhesion, secondary adhesion and corrosion resistance.

In Comparative Example 1, since the adhesion amount of the Ni plating layer was low, the weldability and the corrosion resistance particularly degraded.

Comparative Examples 2 and 3 are examples in which the specimens were produced under [Ni plating condition 3] and [Ni plating condition 4], and in which the current densities were outside the range of the invention. In Comparative Examples 2 and 3, since the current densities were too low, the concentrations of oxygen atoms in the Ni plating layer deviated from the range of the invention, and the corrosion resistance degraded.

In Comparative Example 4, the concentration of an oxygen atom in the Ni plating layer was outside the range of the invention, and the weldability degraded.

In Comparative Examples 5 and 6, the adhesion amount of the chromate film layer was outside the range of the invention, the secondary adhesion degraded in Comparative Example 5, and the weldability degraded in Comparative Example 6, respectively.

In Comparative Examples 7 and 8, the adhesion amount of the film layer including Zr was outside the range of the invention, the secondary adhesion degraded in Comparative Example 7, and the weldability degraded in Comparative Example 8, respectively.

Example 2

Next, a plurality of 0.2 mm-thick cold-rolled steel sheets for a tin plate with a temper grade of 3 (T-3) was used as tin mill black plates, plating was performed under each of the same Ni plating conditions as in "Example 1", and a Ni plating layer was formed on each of the steel sheets. The adhesion amount of Ni was fixed to 0.7 g/m².

Subsequently, a chromate film layer was formed on the Ni plating layer under the same chromate treatment conditions as in "Example 1". The adhesion amount of Cr of the chromate film layer was fixed to 8 g/m².

The same (D) corrosion resistance test as in "Example 1" was performed on a variety of the obtained plating steel sheets, and the depths of piercing corrosion were measured. The obtained results are illustrated in FIG. 1. Meanwhile, "Condition 1", "Condition 3" and "Condition 4" described in FIG. 1 respectively refer to "Ni plating condition 1", "Ni plating condition 3" and "Ni plating condition 4".

In addition, for Invention Example 1 described in Table 1, the concentration (atomic %) of an oxygen atom of the hydroxyl Ni or the Ni oxide in the Ni plating layer was measured using an X-ray photoelectron spectroscopy (XPS). The obtained results are illustrated in FIG. 2.

It is found that the piercing corrosion depth is 0.02 to 0.05 mm at a concentration of oxygen atoms of the hydroxyl Ni or the Ni oxide in the Ni plating layer of 1 to 10 atomic % as illustrated in FIG. 1, and the corrosion resistance against piercing corrosion significantly improves. At a concentration of oxygen atoms of 1 to 20 atomic %, corrosion proceeded along the interface between the Ni plating layer and the base iron. On the other hand, at a concentration of oxygen atoms of less than 1 atomic %, corrosion proceeded along the thickness direction of the steel sheet.

Figure 2:
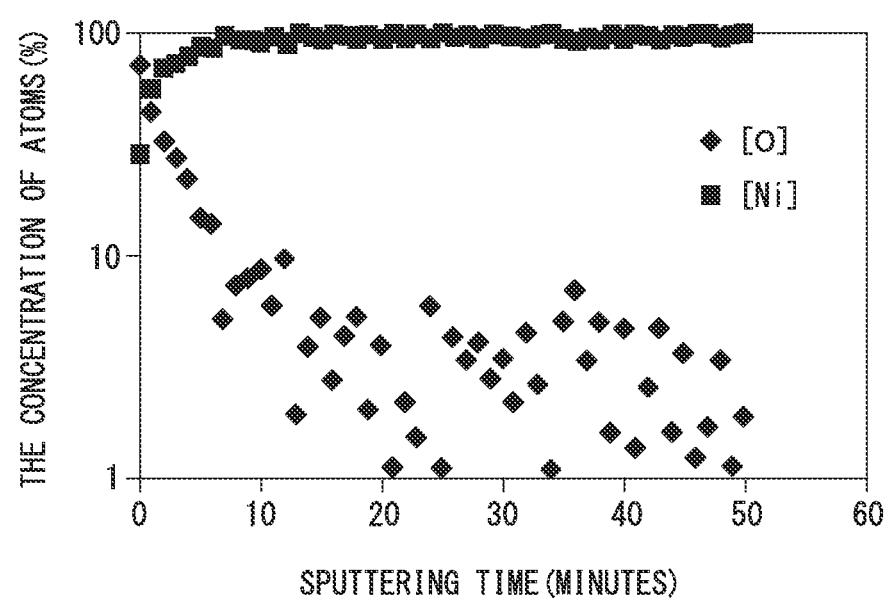
FIG. 2 is a graph illustrating a relationship between a concentration of a nickel atom and the concentration of the oxygen atom in the Ni plating layer, and a sputtering time of X-ray photoelectron spectroscopy (XPS) in Invention Example 1 of Example 1 of the invention.

In addition, it is found that, in the steel sheet (Invention Example 1) including the Ni plating layer manufactured using the manufacturing method that is within the range of the invention, the concentration of an oxygen atom is 1 to 10 atomic % inside the Ni plating layer as illustrated in FIG. 2. Meanwhile, the concentration of oxygen atoms becomes high on the surface of the Ni plating layer (an area until the sputtering time reached 10 minutes), and this is considered to be because the surface of the Ni plating layer is oxidized and a natural oxide film is formed.

Meanwhile, the horizontal axis illustrated in FIG. 2 indicates the sputtering time in XPS, but the time is equivalent to the depth from the surface of the Ni plating layer.

Thus far, the preferred embodiment of the invention has been described in detail with reference to the accompanying drawings, but the invention is not limited to such examples. It is evident that a person having ordinary skill in the technical field of the invention can invent a variety of modification examples or correction examples within the scope of the technical idea described in the claims, and it is natural to consider those examples belonging to the technical scope of the invention.

TABLE 1

| | No. | Ni PLATING CONDITION | THE ADHESION AMOUNT OF Ni (g/m²) | THE CONCENTRATION OF OXYGEN (%) | CHROMATE FILM LAYER (mg/m²) | Zr (mg/m²) | WELDABILITY | ADHESION | SECOND ADHESION | CORROSION RESISTANCE |
|---|---|---|---|---|---|---|---|---|---|---|
| INVENTION EXAMPLES | 1 | 1 | 2.8 | 6.2 | 1.2 | — | A | A | B~A | A |
| | 2 | 1 | 1.2 | 5.5 | 15 | — | A | A | A | A |
| | 3 | 2 | 0.8 | 1.1 | 4 | — | A | A | A | A |
| | 4 | 2 | 0.35 | 2.3 | 5 | — | A | A | A | B~A |
| | 5 | 1 | 0.6 | 3.8 | 38 | — | A | A | A | A |
| | 6 | 1 | 2.4 | 4.4 | 8 | — | A | A | A | A |
| | 7 | 1 | 1.8 | 5.9 | 22 | — | A | A | A | A |
| | 8 | 2 | 0.42 | 1.5 | — | 1 | A | A | B~A | B~A |
| | 9 | 2 | 0.8 | 2.2 | — | 12 | A | A | A | A |
| | 10 | 2 | 1.1 | 7.8 | — | 28 | A | A | A | A |
| | 11 | 1 | 2.4 | 9.8 | — | 37 | A | A | A | A |
| COMPARATIVE EXAMPLES | 1 | 1 | 0.25 | 2.4 | 10 | — | D~C | B | C~B | C~D |
| | 2 | 3 | 1.3 | 0.6 | 21 | — | A | A | A | D |
| | 3 | 4 | 0.8 | 0.4 | — | 0.7 | A | A | D | D |
| | 4 | 1 | 0.8 | 14 | 7 | — | D | A | A | A |
| | 5 | 2 | 2.5 | 4.4 | 0.7 | — | A | A | D | B |

TABLE 1-continued

| | | Ni PLATING | | | | | | | |
|---|---|---|---|---|---|---|---|---|---|
| No. | CONDI-TION | THE ADHESION AMOUNT OF Ni (g/m²) | THE CONCENTRATION OF OXYGEN (%) | CHROMATE FILM LAYER (mg/m²) | Zr (mg/m²) | WELDABILITY | ADHESION | SECOND ADHESION | CORROSION RESISTANCE |
| 6 | 2 | 0.6 | 1.5 | <u>45</u> | — | D | A | A | A |
| 7 | 2 | 1.5 | 3.8 | — | <u>0.6</u> | A | A | D | B |
| 8 | 2 | 0.8 | 1.6 | — | <u>48</u> | D | A | A | A |

The invention claimed is:

1. A steel sheet used to manufacture a container, the steel sheet comprising:
a Ni plating layer; and
a chromate film layer or a film layer including Zr, on the Ni plating layer,
wherein the Ni plating layer includes one or more of a hydroxyl Ni and a Ni oxide,
an adhesion amount of the Ni plating layer in terms of an amount of Ni is 0.3 g/m² or more,
a concentration of oxygen atoms of the Ni plating layer due to the hydroxyl Ni and the Ni oxide is 1 to 10 atomic %,
an adhesion amount of the chromate film layer in terms of an amount of Cr is 1 to 40 mg/m², and
an adhesion amount of the film layer including Zr in terms of an amount of Zr is 1 to 40 mg/m².

2. The steel sheet used to manufacture a container according to claim 1, wherein
the concentration of oxygen atoms is 1 to 10 atomic % in an entire area of a thickness of the Ni plating layer excluding a natural oxide film formed on a surface of the Ni plating layer.

3. A method of manufacturing a steel sheet used to manufacture a container according to claim 1, the method comprising:
forming the Ni plating layer including one or more of the hydroxyl Ni and the Ni oxide by dipping a base steel sheet in a plating bath and then performing a cathode-electrolysis, wherein a current density is set to a value higher than a critical current density of precipitation of Ni, the critical current density depending on a plating bath condition including a concentration of a Ni ion and a pH thereof, and wherein the plating bath consists of an aqueous solution in which one or more of a Ni sulfate and a Ni chloride is dissolved, and
forming the chromate film layer of which the adhesion amount in terms of the amount of Cr is 1 to 40 mg/m² on the Ni plating layer or forming the film layer including Zr of which the adhesion amount in terms of the amount of Zr is 1 to 40 mg/m², on the Ni plating layer.

4. The method of manufacturing a steel sheet according to claim 3,
wherein a concentration of the Ni sulfate of the aqueous solution of the plating bath is set to 5% to 30% and a concentration of the Ni chloride of the aqueous solution of the plating bath is set to 5% to 30%.

5. The method of manufacturing a steel sheet according to claim 3,
wherein the pH of the plating bath is set to 2 to 4.

6. The method of manufacturing a steel sheet according to claim 4,
wherein the pH of the plating bath is set to 2 to 4.

* * * * *